United States Patent [19]

Maeda et al.

[11] 3,875,843

[45] Apr. 8, 1975

[54] PLASTIC FASTENERS

[75] Inventors: Kazuya Maeda; Susumu Kusakabe; Sigemi Fujihara, all of Yokohama, Japan

[73] Assignee: Matsushita Electric Industrial Co., Ltd., Osaka, Japan

[22] Filed: July 23, 1973

[21] Appl. No.: 381,572

[30] Foreign Application Priority Data
July 26, 1972 Japan............................ 47-75315

[52] U.S. Cl.................. 85/5 R; 24/211 M; 229/45
[51] Int. Cl..................... F16b 13/10; F16b 19/00
[58] Field of Search............ 85/5 R, 5 P, 84, 83, 82, 85/72, 26; 24/211 M, 211 R, 73 P, 73 RM; 229/45; 206/DIG. 31

[56] References Cited
UNITED STATES PATENTS

| | | | |
|---|---|---|---|
| 1,150,358 | 8/1915 | Gilmer................. | 85/84 X |
| 2,102,999 | 12/1937 | De Vries............... | 85/84 |
| 2,421,238 | 5/1947 | Borah................. | 85/5 R X |
| 2,940,558 | 6/1960 | Schlueter............. | 85/5 R X |
| 3,272,061 | 9/1966 | Seckerson............ | 85/82 |
| 3,438,302 | 4/1969 | Sandor................ | 85/84 |

FOREIGN PATENTS OR APPLICATIONS

| | | | |
|---|---|---|---|
| 103,932 | 2/1917 | United Kingdom...... | 85/84 |
| 976,418 | 11/1964 | United Kingdom...... | 85/82 |
| 1,187,430 | 4/1970 | United Kingdom...... | 85/5 R |

*Primary Examiner*—Ramon S. Britts
*Attorney, Agent, or Firm*—Stevens, Davis, Miller & Mosher

[57] ABSTRACT

A device comprising a female fastening member including a hollow portion formed at one end with a flange and having hingedly connected to the other end a pair of claws pivotally movable outwardly in opposite directions from an inoperative position in which the claws are disposed substantially horizontally in parallel relationship to an operative position in which the claws are disposed substantially vertically in aligned relationship, and a male member adapted to be inserted in the female member and to bring the claws to the operative position while the male member is latched to the female locking member just by inserting or by turning after insertion. The flange of the female member may be eliminated and instead the hollow portion may be provided with two pairs of claws each pair being hingedly connected to one of opposite ends of the hollow portion. In use, the female member is first inserted in openings formed in walls of boxes or other containers to be secured together and aligned with each other, and then the male member is inserted in and latched to the female member and the claws are brought to the operative position to hold the plurality of walls between the claws and the flange or between the two pairs of claws so that they can be positively and firmly fastened together.

10 Claims, 31 Drawing Figures

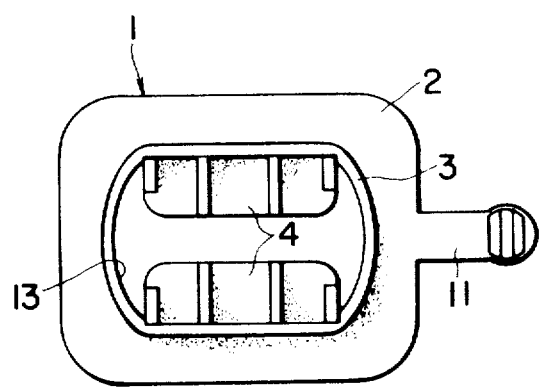
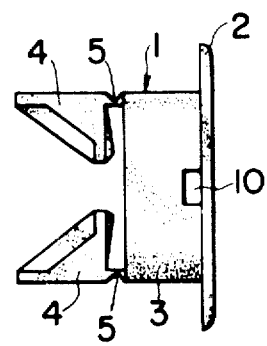
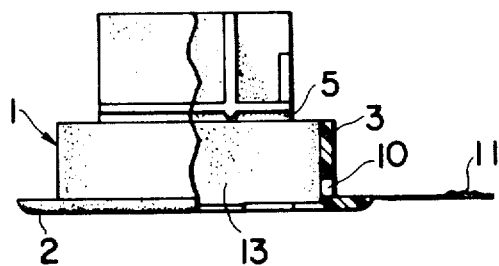
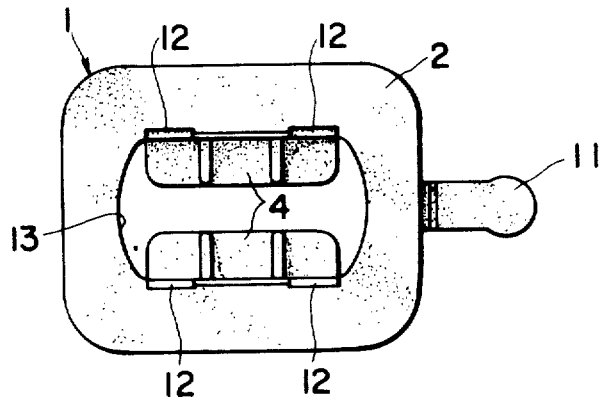

3,875,843

PLASTIC FASTENERS

This invention relates to plastic fasteners, and more particularly it is concerned with a plastic fastener effective to detachably fasten together walls of boxes or other containers when it is required to fasten together the walls of an upper box and a lower box of a package consisting of a plurality of boxes.

Plastic locks of the type described and claimed in this invention have not hitherto been in use. Heretofore, it has been customary to use bands 47 to tie two boxes 48 and 49 together as shown in FIG. 13 when it is required to fasten them together to form a package, or to provide means whereby an upper box 48 and a lower box 49 can be secured together by causing an engaging strip 50 formed in the former and an engaging strip 51 formed in the latter to catch against each other.

Some disadvantages are associated with the fastening devices of the prior art described above. When the bands 47 are used to tie the boxes, they tend to get loosened or broken during transportation. This device is not economical because the bands used for typing boxes cannot be used again once they are broken. The provision of engaging strips in the upper and lower boxes which catch against each other to fasten the two boxes together involves a time consuming operation in working on the boxes. Besides, one should be careful not to lower the mechanical strength of the package in providing engaging strips on the boxes which make up the package. Difficulty is experienced in opening the package and separating the two boxes from each other once the upper box and the lower box are brought into catching engagement, and the operation of securing the upper and lower boxes together by bringing the engaging strips into catching engagement again to form a package is troublesome and low in efficiency.

An object of the invention is to provide a fastening device for forming packages comprising a female member including a tubular hollow portion formed at one end with a flange and having hingedly connected to the other end a pair of claws pivotally movable outwardly in opposite directions from an inoperative position in which the upper and lower claws are disposed substantially horizontally in parallel relationship to an operative position in which the claws are disposed substantially vertically in aligned relationship, and a male member adapted to be inserted in the female member and to bring the claws to the operative position and fix the same in place in such position in which they are substantially parallel to the flange whereby walls of boxes or other containers to be secured together can be firmly and positively held between the claws and the flange.

Another object of the invention is to provide a plastic fastener of the type described with means whereby the male member can be detachably latched to the female member with ease.

Another object of the invention is to provide a plastic fastener of the type described wherein the male member can be connected to the female member by turning after insertion, and the former is latched to the latter as it brings the claws into the operative position through the agency of hinges in the process of turning.

Still another object of the invention is to provide a fastening device for forming packages comprising a female member including a hollow portion provided with two pairs of claws each pair being hingedly connected to one of opposite ends of the hollow portion and the claws of each pair being capable of moving pivotally outwardly in opposite directions from an inoperative position in which the claws of each pair are disposed substantially horizontally in parallel relationship to an operative position in which the claws of each pair are disposed substantially vertically in aligned relationship, and a male member adapted to be inserted in and latched to the female member by turning after insertion, the claws of two pairs of the female member being brought to the operative position in the process of turning of the male a member whereby walls of boxes or other containers to be fastened together can be firmly and positively held between the two pairs of claws.

According to the invention, there is provided a plastic fastener comprising a female member and a male member adapted to be detachably latched one to the other, said female member including a hollow portion formed at one end with a flange and having hingedly connected to the other end a pair of claws, such pair of claws being adapted to move pivotally from an inoperative position in which the claws are disposed substantially horizontally in parallel relationship to an inoperative position in which they are disposed substantially vertically in aligned relationship when the male member is inserted in the female member, the female member being first inserted in aligned openings formed in a plurality of walls of boxes or other containers to be secured together and the male member then being removably inserted in the female member so as to pivotally move the claws outwardly in opposite directions to the operative position in which they are disposed substantially vertically in aligned relationship in parallel to the flange whereby the plurality of walls of the boxes or other containers to be secured together can be held positively and firmly between the claws and the flange through the aligned openings.

According to the invention, the flange of the cylindrical portion of the female member may be eliminated and instead two pairs of claws may be provided with each pair being hingedly connected to one of opposite ends of the cylindrical member so as to hold the plurality of walls between the two pairs of claws, and the male member may be constructed such that it is detachably latched to the female member and moves the claws of the female member to the operative position when the male member is turned after being inserted in the female member.

FIG. 1a, FIG. 1b, FIG. 1c and FIG. 1d are a front view, a side view, a sectional plan view and a bottom plan view respectively of the female member of the plastic fastener of a first embodiment of this invention;

Figure 3:
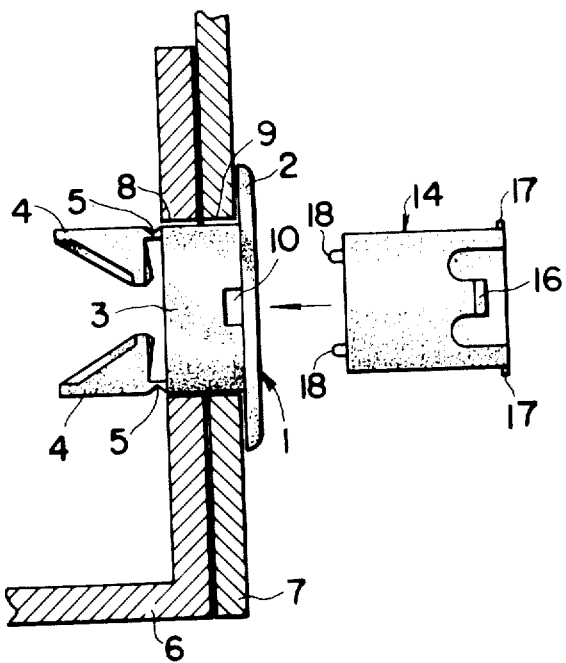
FIG. 3 is a sectional side view of the female member and the male member shown separately before being connected to each other.
Figure 4:
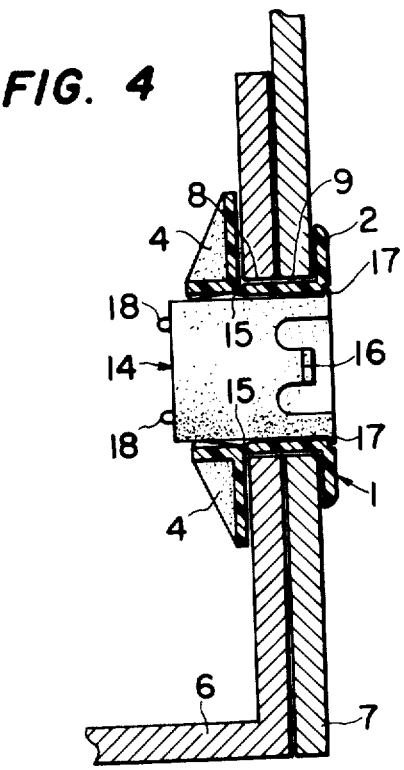
FIG. 4 is a sectional side view of the female member and the male member shown in a position in which the latter is inserted in and connected to the former.
Figure 5A:
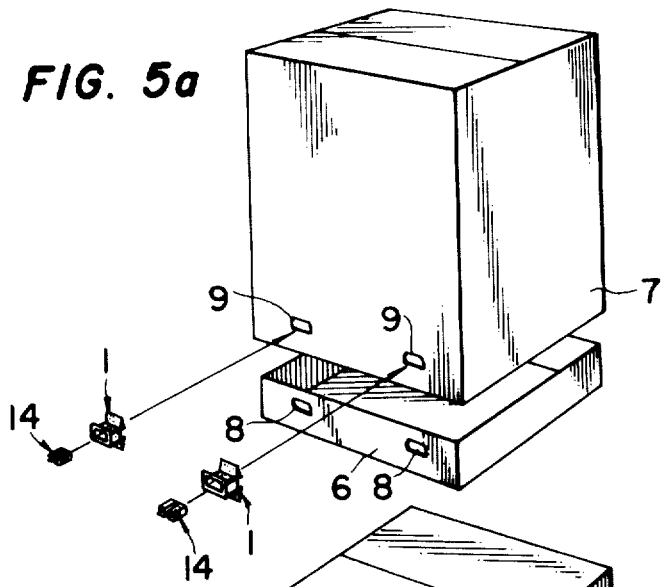
FIG. 5a and FIG. 5b are perspective views of an upper box and a lower box, FIG. 5a showing the two boxes before being connected and secured to each other and FIG. 5b showing them after being connected and secured to each other by means of the fastening device according to the invention.
Figure 5B:
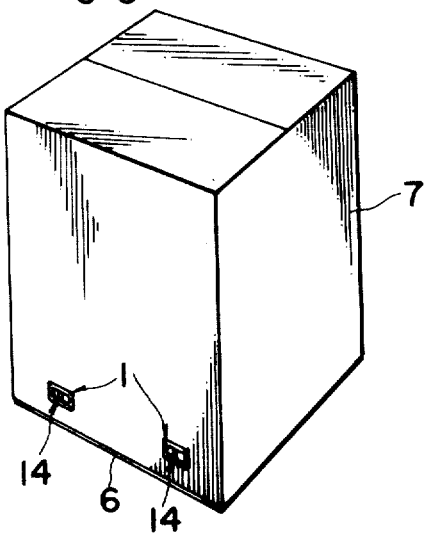

The invention will now be described with reference to embodiments shown in the drawings. In FIG. 1a, FIG. 1b, FIG. 1c and FIG. 1d, reference numeral 1 generally designates a female member of the fastener including a tubular hollow portion 3 formed integrally at its rear end with a flange 2 and having hingedly connected at 5 to its front end a pair of claws 4, 4. The portion 3 is adapted to be inserted in openings 8 and 9 formed in walls of a lower box 6 and an upper box 7 respectively and aligned with each other, as shown in FIGS. 3 and 4. The pair of claws 4, 4 are disposed substantially in parallel relationship when they are in an inoperative position and can be pivotally moved outwardly in opposite directions from the inoperative position to an operative position in which the claws 4, 4 are disposed substantially transversely of the axis of the portion 3 when the female member of the fastener receives therein a male member subsequently to be described.

Numeral 10 designates a pair of engaging opening each being formed at one of opposite sides of the portion 3 in a position in which one edge of the opening 10 is adjacent the flange 2. Numeral 11 designates a tab projecting from one end thereof in one direction so as to be used when the female member is to be removed from the openings in which it is inserted. Numeral 12 designates two pairs of recesses each formed at an inner peripheral edge of the flange 2 in a position in which the recess is adjacent an end of a bore 13 formed within the hollow portion 3.

Figure 2A:
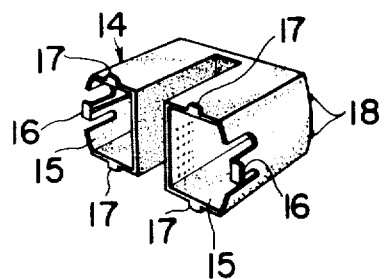
FIG. 2a, FIG. 2b, FIG. 2c and FIG. 2d are a perspective view, a sectional plan view, a side view and a front view respectively of the male member of the plastic fastener of the first embodiment of the invention.
Figure 2B:
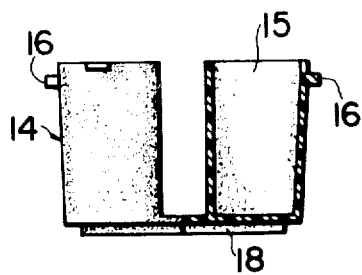
Figure 2C:
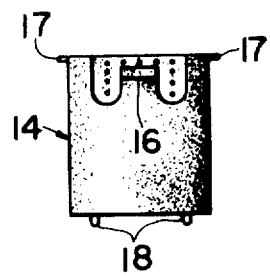
Figure 2D:
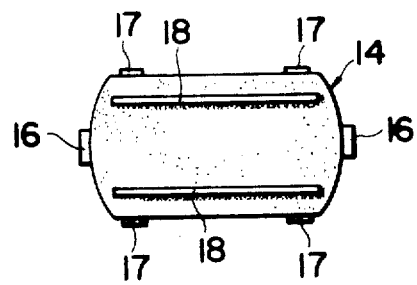

In FIG. 2a, FIG. 2b, FIG. 2c and FIG. d, numeral 14 generally designates a male locking member adapted to be inserted in and detachably latched to the female member 1. The male member includes a pair of substantially identical tubular hollow portions 15, 15 adapted to be fitted in the bore 13. The hollow portions 15, 15 are open at one or rear end and closed at the other or front end and are connected together by a common wall extending from an outer wall of one portion 15 to an outer wall of the other portion 15. The portions 15, 15 are disposed in substantially parallel and spaced relationship so that when the fingers of an operator's hand are inserted in the hollow portions 15, 15 through the open end and moved toward each other, the common wall connecting the portions 15, 15 to each other is bent to allow the open ends of the portions 15, 15 to be moved toward each other. Thus, if this operation is performed when the male member 14 is disposed in the female member 1, the portions 15 of the latter can be bent inwardly at the open ends. Inner surfaces of walls of the hollow portions 15, 15 are formed with irregularities to prevent slipping of the fingers inserted in the bores of the portions 15, 15.

Numeral 16 designates a pair of latching projections each formed in the outer wall of one of the portions 15, 15 at the open end and adapted to be received in one of the engaging openings 10, 10 formed in the female member 1. Numeral 17 designates two pairs of locking projections formed on side walls of the portions 15, 15 at the open end and each adapted to be received in one of the recesses 12, 12 formed in the female member 1. Numeral 18 designates a plurality of parallel ribs on the outer surface of the common wall connecting together the two portions 15, 15 for urging the claws 4 to their open positions.

The manner in which the plastic fastening member shown in FIG. 1 and FIG. 2 are used to fasten the lower box 6 and the upper box 7 together will now be described. First, the portion 3 of the female member 1 is inserted in the aligned openings 8 and 9 formed in the lower and upper boxes 6 and 7 respectively, and then the male member 14 is inserted in the female member 1 so that the portions 15, 15 may be fitted in the bore 13 of the portion 3. At this time, the latching projections 16, 16 are each inserted in one of the engaging openings 10, and the parallel ribs 18, 18 push and move the claws 4, 4 and cause the same to pivot outwardly in opposite directions from the inoperative position to the operative position in which the claws 4, 4 are disposed substantially in aligned relationship in a transverse direction relative to the axis of the portion 3 and maintained in contact with a portion of the wall of the lower box 6 above and below the edge of the opening 8 as shown in FIG. 4. Thus the lower box 6 and upper box 7 are secured together and held between the flange 2 and the claws 4, 4.

When it is desired to release the lower box 6 from engagement with the upper box 7, the fingers are inserted in the bores of the two portions 15, 15 of the male member 14 and moved toward each other to bend the male member 14. By pulling the male member 14 toward the operator at this time, it is possible to readily remove the member 14 from the member 1 and consequently to separate the upper box 7 from the lower box 6.

As described above, the female member of the plastic locks according to the invention comprises a portion adapted to be inserted in aligned openings formed in walls of boxes to be fastened together, a flange disposed at one end of the cylindrical portion and adapted to come into engagement with a portion of the wall disposed around the edge of the opening formed therein, and a pair of claws hingedly connected to the other end thereof. The male member is adapted to be inserted in and latched to the female member and to move the claws to an operative position. By virtue of this construction, the plastic fastener is effective to fasten the boxes together readily just by inserting the female member in the openings and then inserting the male member in the female member to latch the latter to the former and bring the claws into the operative position. When it is desired to release the boxes from engagement with each other, the fingers are inserted in bores of two portions of the male member and moved toward each other to bend the male member to thereby release projections formed in the male member from engagement in engaging openings formed in the female member. If the fingers are moved toward the operator at this time, the male member can be readily detached from the female member. Thereafter, the boxes can be separated from each other by pulling an extension of the flange of the female member to remove the same from the openings in the boxes. From the foregoing description, it will be appreciated that the plastic fastener according to the invention is very high in operation efficiency.

Figure 6A:
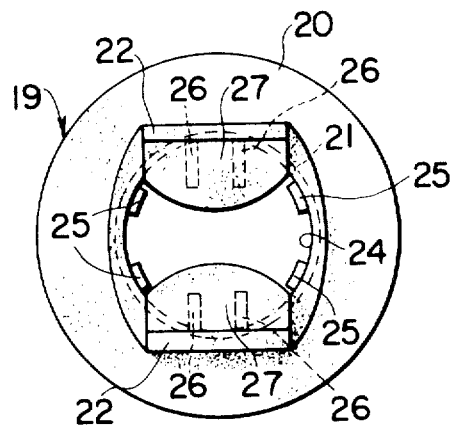
FIG. 6a, FIG. 6b and FIG. 6c are a front view, a side view and a sectional plan view respectively of the female member of a second embodiment of the invention.
Figure 6C:
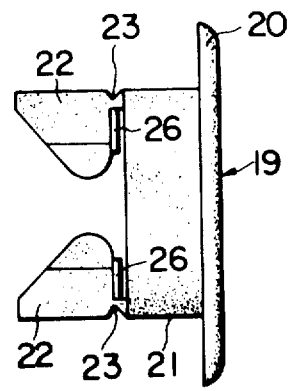
Figure 6B:
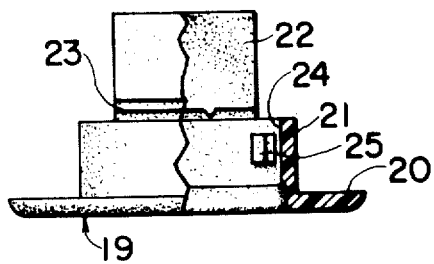
Figure 7A:
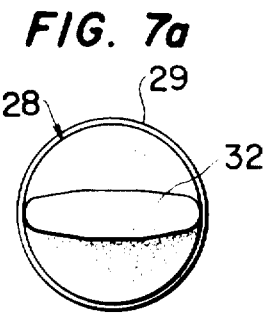
FIG. 7a, FIG. 7b, FIG. 7c and FIG. 7d are a front view, a sectional plan view, a bottom plan view and a side view respectively of the male member of the second embodiment of the invention.
Figure 7B:
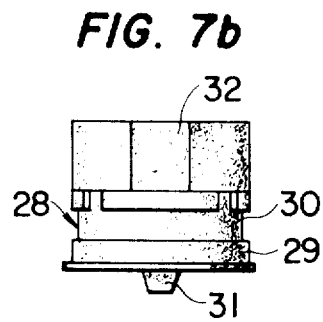
Figure 7C:
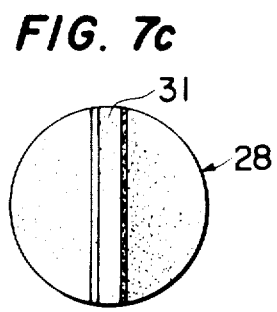
Figure 7D:
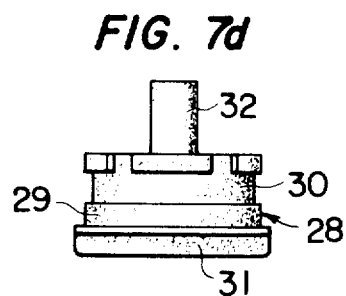

A second embodiment will now be described with reference to FIG. 6a to FIG. 9. In FIG. 6, numeral 19 generally designates a female member including a hollow portion 21 formed internally at its one or rear end with a flange 20 and having hingedly connected at 23 to the other or front end a pair of claws 22, 22 disposed substantially in parallel relationship when they are in an inoperative position and adapted to be pivotally moved outwardly in opposite directions from the inoperative position to an operative position in which they are disposed substantially aligned transversely of the axis of the portion 21. Numeral 24 designates a bore formed in the cylindrical portion 21. Numeral 25 designates a plurality of guide projections formed on an inner wall surface of the portion 21, numeral 26 designates two pairs of projections each pair being formed one a rear end of one of the claws 22, 22, and numeral 27 designates a plurality of engaging grooves each being disposed between the projections 26, 26 of each pair.

In FIG. 7a to 7d, 28 generally designates a male member adapted to be received in the female member 19. Numeral 29 designates a portion adapted to be fitted in the bore 24, and numeral 30 designates a peripheral groove formed in the cylindrical portion 29 in which the guide projections 25, 25 of the female member 19 are adapted to move in sliding motion. Numeral 31 designates a knob adapted to turn the male member 28 when inserted in the female member 19. Numeral 32 designates a cam lug projecting forwardly from the front end of the cylindrical portion 29 for moving the claws 22, 22 to the operative position.

Figure 8:
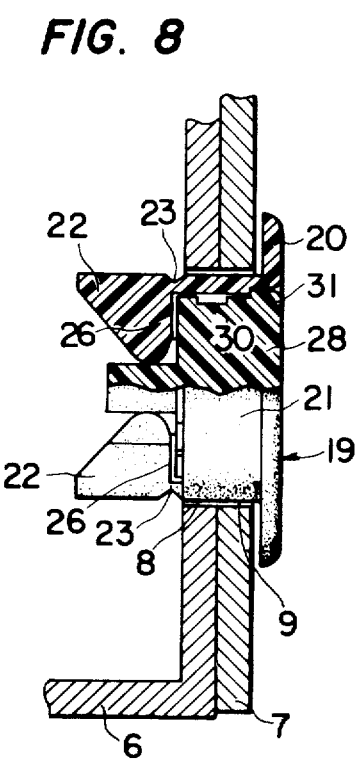
FIG. 8 is a sectional side view of the female member and the male member of the second embodiment shown in the process of being latched one to the other.
Figure 9:
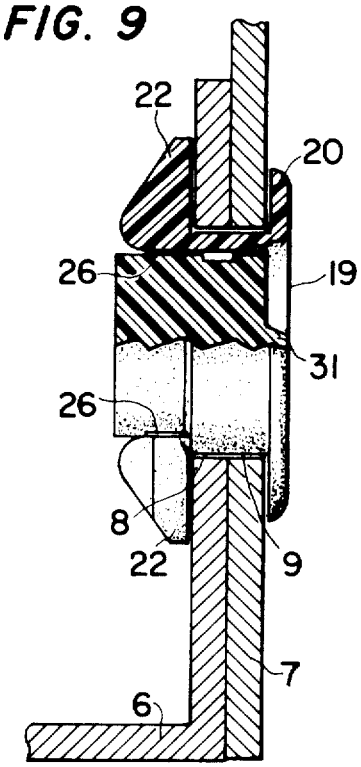
FIG. 9 is a sectional side view of the female member and the male member of the second embodiment shown in a position in which the latter is latched to the former.
Figure 10A:
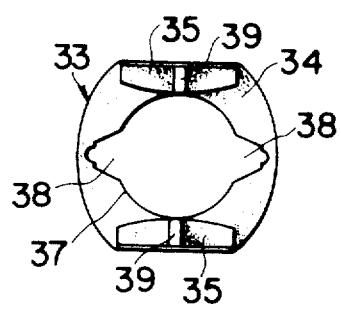
FIG. 10a, FIG. 10b and FIG. 10c are a front view, a plan view and a side view respectively of the female member of a third embodiment of the invention.
Figure 10C:
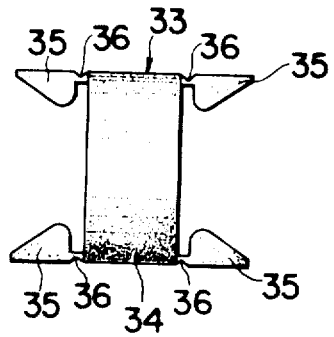
Figure 10B:
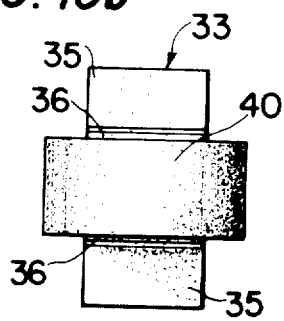

The operation of securing the lower and upper boxes 6 and 7 together by using the second embodiment of the invention will now be described. First, the female member 19 is inserted in the aligned openings 8 and 9 formed in the lower and upper boxes 6 and 7 respectively as shown in FIG. 8, and then the male member 28 is inserted in the female member 19 so that the cylindrical portion 29 may be fitted in the bore 24 of the portion 21 of the member 19. Thereafter, the knob 31 is held by the fingers of the operator's hand and manipulated so as to turn the male member 28 in the female member 19. As a result, the claws 22, 22 are pivotally move outwardly in opposite directions from the inoperative position to the operative position as shown in FIG. 9. When the claws 22, 22 are brought to the operative position, the opposite ends of the lug 32 each fit in the engaging groove 27 formed between the projections 26 of each pair, thereby latching the claws 22, 22 to the rotary shaft 32. Thus the lower and upper boxes 6 and 7 are secured together.

When it is desired to release the lower and upper boxes 6 and 7 from engagement with each other, the knob 31 is turned in a direction opposite to the direction in which it was turned in latching the two members 19 and 28 to each other, and the male member 28 is withdrawn from the female locking member 19. This permits the upper and lower boxes 6 and 7 to be readily separated from each other.

As aforementioned, the female member of the second embodiment of the plastic fastening member comprises a portion formed at one end with a flange and having hingedly connected to the other end a pair of claws adapted to move pivotally from an inoperative position to an operative position, and the male member is adapted to be inserted in the female member and turned to be latched thereto. When the male member is turned in the female member, the shaft of the former is brought into engagement with the engaging grooves formed in the latter, thereby bringing the former into firm engagement with the latter. It will be appreciated that the lower and upper boxes 6 and 7 can be brought into and out of engagement with each other in one operation, thereby facilitating forming of a package.

A third embodiment of the invention will be described with reference to FIG. 10a to FIG. 12. In FIGS. 10a to 10c, 33 generally designates a female member including a hollow portion 34 provided with two pairs of claws 35, 35 each pair of claws being hingedly connected at 36 to one of opposite ends of the portion 34. Numeral 37 designates a bore formed in the portion 34. Numeral 38 designates a pair of axial grooves formed in an inner wall of the portion 34 and disposed in position diametrically opposite to each other. Numeral 39 designates a plurality of engaging grooves each formed substantially in the middle of a rear end of one of the claws 35.

Figure 11A:
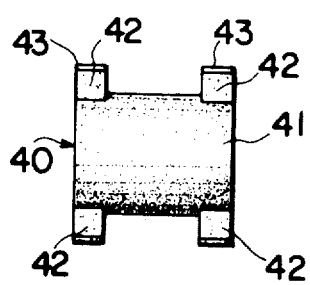
FIG. 11a, FIG. 11b and FIG. 11c are a side view, a plan view and a front view respectively of the male member of the third embodiment of the invention.
Figure 11C:
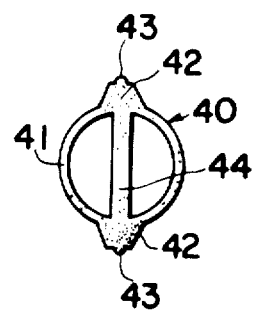
Figure 11B:
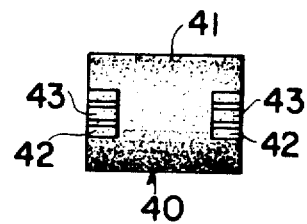

In FIGS. 11a to 11c, numeral 40 generally designates a male member adapted to be inserted in the female member 33. Numeral 41 designates a cylindrical portion adapted to be fitted in the bore 37 of the portion 34 of the female member 33. Numeral 42 designates two pairs of projections each pair of projections 42, 42 being disposed at one of opposite ends of the cylindrical portion 41 and the projections of each pair being disposed in positions in which they are diametrically opposite to each other and extend radially outwardly of the cylindrical portion 41. Numeral 43 designates two pairs of engaging portions each portion being formed at the crest of one of the projections 42 and adapted to fit in one of the engaging grooves 39, 39 formed in the claws 35, 35 of the female member 33. Numeral 44 designates a bar formed integrally with the cylindrical portion 41 and disposed at one end thereof.

Figure 12A:
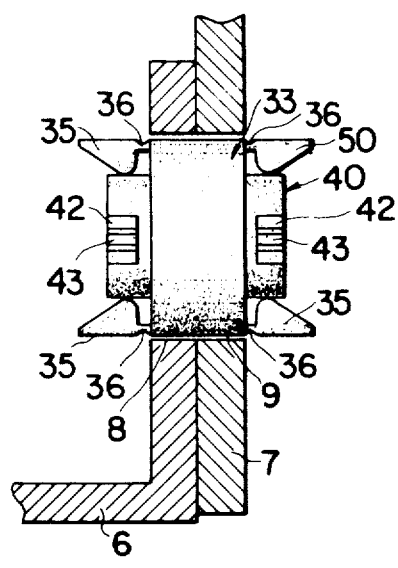
FIG. 12a and FIG. 12b are sectional side views of the female member and the male member of the third embodiment, FIG. 12a showing the two members in the process of being latched one to the other and FIG. 12b showing them in a position in which they are latched one to the other.
Figure 12B:
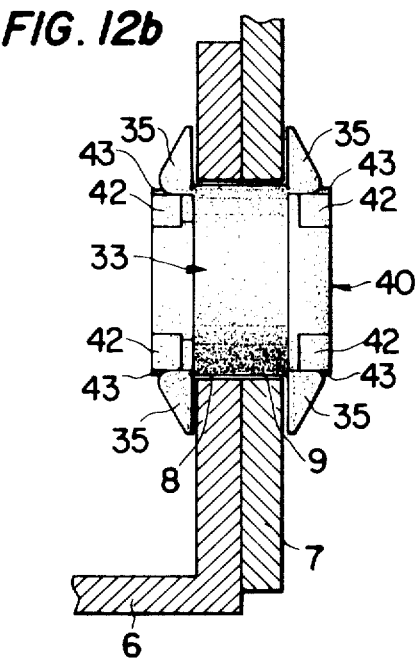
Figure 13:
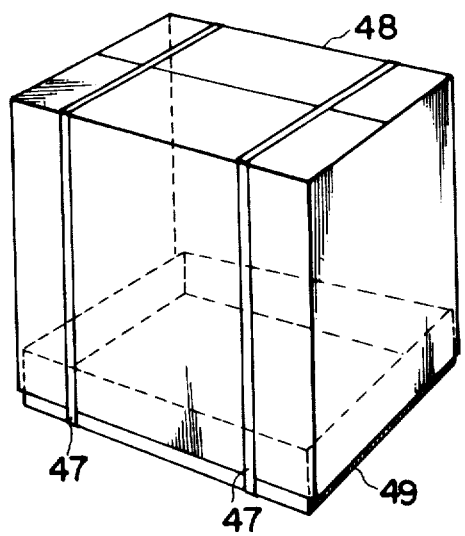
FIG. 13 and FIG. 14 are perspective views of boxes in explanation of the manner in which they are secured together to form a package according to the prior art.
Figure 14:
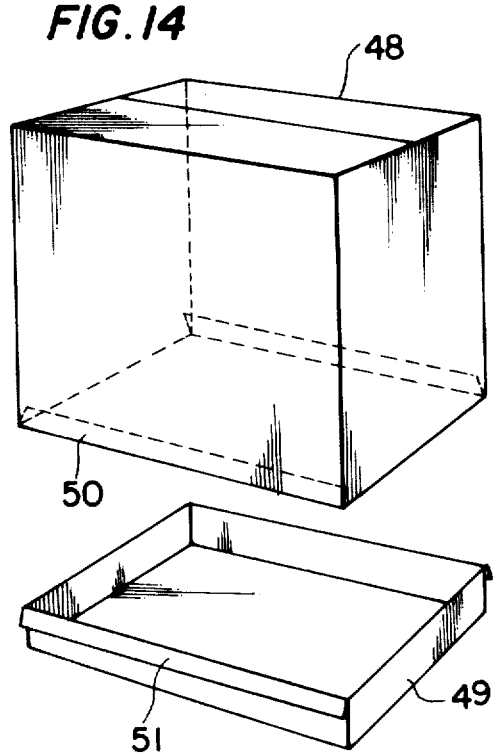

The operation of securing the lower and upper boxes 6 and 7 together by using the third embodiment of the invention will be described. First, the female member 33 is inserted in the aligned openings 8 and 9 formed in the lower and upper boxes 6 and 7 respectively as shown in FIG. 12a. Then, the male member 40 is inserted in the female member 33 so that the cylindrical portion 41 of the former may be fitted in the bore 37 of the portion 34 of the latter. Thereafter, the male member 40 is turned in the female member 33 by holding the bar 44 by the fingers. As a result, the claws 35, 35 at the opposite ends of the portion 34 are brought to the operative position as shown in FIG. 12b by the cam action between the claws and the projections 42. In this position, the claws 35, 35 are firmly held in position by the engaging portion 43 of the female member 40 each fitting in the engaging groove 39 in one of the claws 35, 35, whereby the lower and upper boxes 6 and 7 can be held between the claws 35, 35 and secured together by the members 33 and 40.

When it is desired to release the lower and upper boxes 6 and 7 from engagement with each other, the bar 44 is turned in a direction opposite to the direction in which it was turned in connecting the two members 33 and 40 together, and the male member 40 is withdrawn from the female member 33. It will be appreciated that, since the two members of the fastening device according to the invention are formed separately and can be freely latched and unlatched to each other, it is possible to fasten together walls of upper and lower boxes in one operation. This is conducive to increased efficiency in forming a package and enables the package to be opened and repacked with great ease.

While particular embodiments of this invention are shown above, it will be understood, of course, that the invention is not to be limited thereto, since many modifications may be made, and it is contemplated therefore, by the appended claims, to cover any such modifications as fall within the true spirit and scope of this invention.

What I claim is:

1. A plastic fastener for detachably securing together walls having aligned openings therein, comprising a female member and a male member adapted to be detachably latched one to the other, said female member including
a tubular hollow portion having openings in the peripheral wall thereof,
a flange formed at one end of said hollow portion,
a pair of claws hinge-connected to the other end of said tubular hollow portion at the opposite sides of said other end, said claws being movable between an inoperative position in which said claws do not extend laterally beyond the periphery of said hollow portion and an operative portion in which said claws are expanded laterally and extend substantially parallel to said flange, said female being insertable into said aligned openings in said walls with said claws being in their inoperative position until said flange is brought into engagement with one of said walls, said male member comprising
a pair of laterally spaced tubular hollow portions,
a resilient common wall interconnecting one end of each of said hollow portions and closing said one ends, said hollow portions having their other ends open and resiliently movable toward each other,
latching projections extending laterally from the outer peripheral surfaces of said tubular hollow portions of said male member adjacent said open ends, said tubular hollow portions of said male member when inserted into the tubular hollow portion of said female member with their closed ends forward being snugly received and engaging the claws of said female member to pivotally move said claws to their operative position, the latching projections on said male member being brought into latching engagement with said openings when said male member is received in position in said female member, said tubular hollow portions of said male member being open at said other ends to allow the fingers of an operator's hand to be inserted therein to move said open ends of said tubular hollow portions toward each other so that said latching projections are moved out of said latching engagement with said openings when said male and female members are separated.

2. A plastic fastener according to claim 1 further comprising means for stopping said male member in position with respect to said female member.

3. A plastic fastener according to claim 2 in which said stopping means comprise projections on the peripheral side faces of said hollow portions of said male member adjacent said open ends of said hollow portions and cooperating recesses formed in said female member in the inner peripheral edge of said flange.

4. A plastic fastener according to claim 1 in which said male member has a pair of ribs formed on and extending across said closed ends of said hollow portions and said interconnecting wall.

5. A plastic fastener for detachably securing together walls having aligned openings therein, comprising a female member and a male member adapted to be detachably latched one to the other, said female member including
a tubular hollow portions having a bore therein,
a flange formed at one end of said hollow portion,
a pair of claws hinge-connected to the other end of said tubular hollow portion at the opposite sides of said other end, said claws having a triangular configuration and being movable between an inoperative position in which said claws do not extend laterally beyond the periphery of said hollow portion and an operative portion in which said claws are expanded laterally and extend substantially parallel to said flange, said female member being insertable into said aligned openings in said walls with said claws being in their inoperative position until said flange is brought into engagement with one of said walls, said male member comprising
a substantially cylindrical portion rotatably insertable in the bore of the tubular hollow portion of said female member,
cam means formed on one end of said male member and extending diametrically across said end, rotation of said male member in the bore of the tubular hollow portion of said female member moving said cam means into caming engagement with one apex of each of said claws on said female member whereby said claws are expanded into their operative position.

6. A plastic fastener according to claim 5 in which a pair of ridges are formed on the inner surface of each of said claws to form therebetween a groove which extends axially of said female member when said claws are in their operative position, said cam means comprising a cam lug having diametrically opposite end portions for reception in said axial groove when said cam lug is rotated to fully expand said claws into their operative position.

7. A plastic fastener according to claim 6 in which means are formed on the inner peripheral surface of said bore in said female member and the outer peripheral surface of said male member for guiding the relative rotation of said male member with respect to said female member and preventing relative axial movement of said male member with respect to said female member.

8. A plastic fastener according to claim 5 in which said male member has at least one axial end portion connected to and axially extending from said cylindrical portion, said cam means comprising a pair of diametrically opposite cam projections formed on said axial end portion and extending radially beyond the peripheral outer surface of said cylindrical portion, the peripheral inner surface of said bore in said female member being formed with diametrically opposite axial groove through which said cam projections can be moved axially from one of the ends of said bore to a position in which the rotation of said cylindrical portion relative to said female member urges said cam projections into caming engagement with said claws on said female member whereby said claws are forced to their operative position.

9. A plastic fastener according to claim 6 in which each of said claws is formed with a groove which extends axially of said female member when said claws are in their operative position, each of said cam projections having a radially outer end for reception in said groove when said cam projections are rotated to fully expand said claws.

10. A plastic fastener according to claim 9 in which said male portion has two pairs of such cam projections each pair of which is provided on each axial end portion of same male member and in which said female member has two pairs of such claws each pair of which is provided at each axial end of said tubular hollow portion of said female member.

* * * * *